(12) United States Patent
Friestad

(10) Patent No.: US 7,513,200 B2
(45) Date of Patent: Apr. 7, 2009

(54) SEED SINGULATOR FOR A SEED METERING SYSTEM IN A SEEDING MACHINE

(75) Inventor: Michael Eric Friestad, Rock Island, IL (US)

(73) Assignee: Deere & Company, Moline, IL (US)

( * ) Notice: Subject to any disclaimer, the term of this patent is extended or adjusted under 35 U.S.C. 154(b) by 302 days.

(21) Appl. No.: 11/513,456

(22) Filed: Aug. 31, 2006

(65) Prior Publication Data

US 2008/0053352 A1    Mar. 6, 2008

(51) Int. Cl.
*A01C 7/00* (2006.01)
*A01C 9/00* (2006.01)

(52) U.S. Cl. .................................................. 111/185

(58) Field of Classification Search ......... 111/183–185, 111/170, 174, 177
See application file for complete search history.

(56) References Cited

U.S. PATENT DOCUMENTS 5,848,571 A    12/1998   Stufflebeam et al. ........ 111/185
6,481,647 B1   11/2002   Keaton et al. ............... 239/654
6,651,570 B1   11/2003   Thiemke ..................... 111/184
2006/0266269 A1*  11/2006   Eben et al. .................. 111/185
2007/0039529 A1*  2/2007   Sauder et al. ............... 111/174

* cited by examiner

*Primary Examiner*—Christopher J. Novosad

(57) ABSTRACT

A seeding machine includes at least one seed metering system. Each seed metering system includes a housing, a seed disk and a seed singulator. The seed disk is disposed within the housing. The seed disk includes a rotational axis and a plurality of seed cells angularly spaced at a common radius about the rotational axis. The seed cells define a generally circular travel path. A seed singulator includes a bracket, a first resilient seed deflector and a second resilient seed deflector. The first resilient seed deflector is coupled with the bracket and deflectable relative to the bracket upon engaging a seed in one of the seed cells. The second resilient seed deflector is coupled with the bracket and deflectable relative to the bracket upon engaging a seed in one of the seed cells.

21 Claims, 3 Drawing Sheets

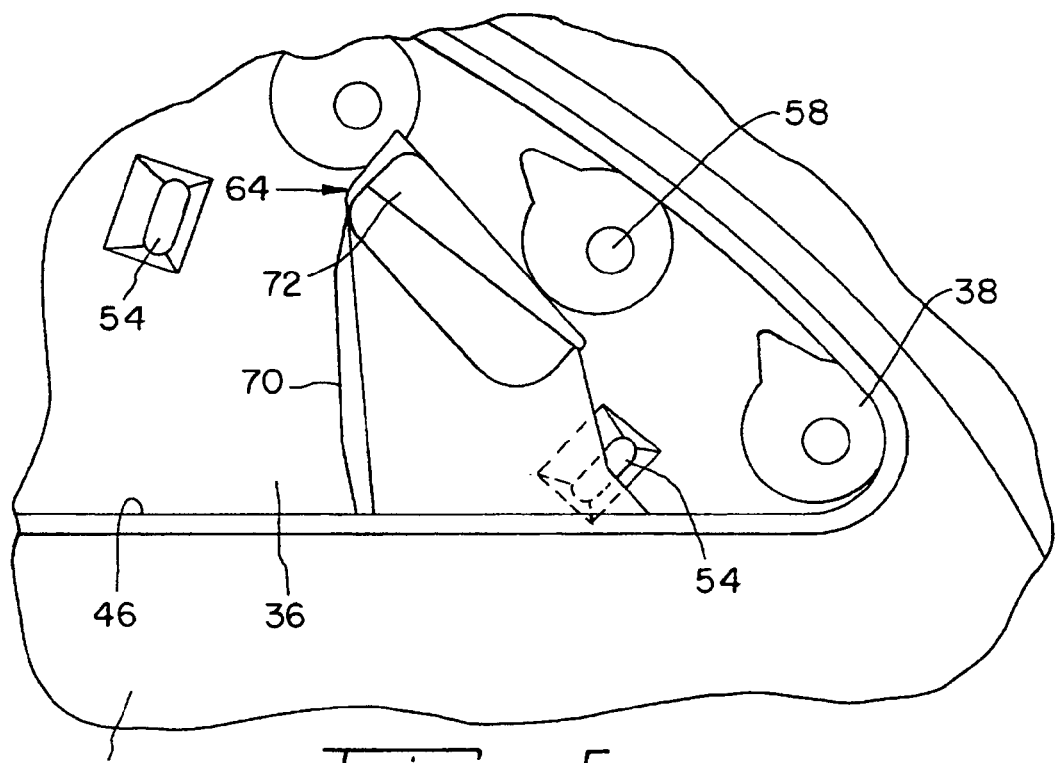
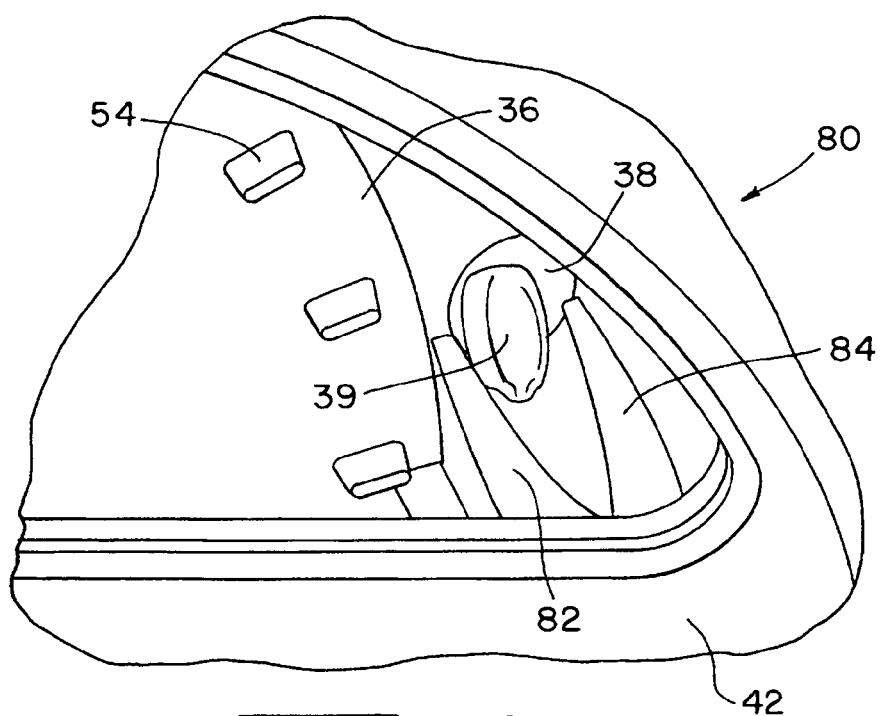

SEED SINGULATOR FOR A SEED METERING SYSTEM IN A SEEDING MACHINE

FIELD OF THE INVENTION

The present invention relates to agricultural seeding machines, and, more particularly, to seed metering systems used to meter seeds for placement in a seed trench.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system receives the seeds in a bulk manner from the seed hopper carried by the frame. Different types of seed metering systems may be used such as seed plates, finger plates, and seed disks. In the case of a seed disk metering system, a seed disk is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disk to assist in movement of the seeds into the seed cells. The seeds are singulated and discharged at a predetermined rate to the seed placement system.

The seed placement system may be categorized as a gravity drop system or a power drop system. In the case of a gravity drop system, a seed tube has an inlet end which is positioned below the seed metering system. The singulated seeds from the seed metering system merely drop into the seed tube and fall via gravitational force from a discharge end thereof into the seed trench. The seed tube may be curved in a rearward manner to assist in directing seed into the seed trench. The rearward curvature also assists in reducing bouncing of the seeds back and forth within the tube as it falls therethrough into the seed trench. Further, the rearward curvature reduces bouncing of the seed as it strikes the bottom of the seed trench.

A seed placement system of the power drop variety generally can be classified as a seed conveyor belt drop, rotary valve drop, chain drop or air drop. These types of seed placement systems provide more consistent placement of the seeds along a predetermined path at a desired spacing.

With a seed metering system including a seed disk as described above, the seed disk typically includes a concentric drive shaft having a sprocket on the outboard end which is driven via a ground drive or the like. The concentrically positioned driven shaft and sprockets may limit the compactness (i.e., reduction in overall size) of the seed metering system.

Certain seed types, notably flat corn seed with insecticide or other treatments, are difficult for vacuum meters to singulate. Poor singulation of difficult seed types is characterized by doubles, skips, and bunches of seed carried by the disk. Doubles and skips refer to multiple seeds and no seed respectively in each seed cell. Bunches are multiple seeds carried up by the seed pool accelerators which protrude from the surface of the seed disk. These seed types generally are best planted with a flat seed disk in combination with double eliminator. Compared to a celled disk, a flat disk has less favorable seed trajectory into the seed tube, generally requires more vacuum, and a production "double eliminator" adjustment is difficult.

What is needed in the art is an agricultural seeding machine having an accurate, efficient and compact seed metering system.

SUMMARY OF THE INVENTION

The present invention provides a seed singulator including a "bunch blocker" and a "double eliminator" which can be used with a celled seed disk.

The invention comprises, in one form thereof, a seeding machine including at least one seed metering system. Each seed metering system includes a housing, a seed disk and a seed singulator. The seed disk is disposed within the housing. The seed disk includes a rotational axis and a plurality of seed cells angularly spaced at a common radius about the rotational axis. The seed cells define a generally circular travel path. A seed singulator includes a bracket, a first resilient seed deflector and a second resilient seed deflector. The first resilient seed deflector is coupled with the bracket and deflectable relative to the bracket upon engaging a seed in one of the seed cells. The second resilient seed deflector is coupled with the bracket and deflectable relative to the bracket upon engaging a seed in one of the seed cells.

The invention comprises, in another form thereof, a seeding machine including at least one seed metering system. Each seed metering system includes a housing, a seed disk and a seed singulator. The seed disk is disposed within the housing. The seed disk includes a rotational axis and a plurality of seed cells angularly spaced at a common radius about the rotational axis. The seed cells define a generally circular travel path. The seed singulator includes a resilient member and a seed deflector. The resilient member is deflectable upon the seed deflector engaging a seed in one of the seed cells, and the seed deflector is positioned adjacent the travel path of the seed cells.

BRIEF DESCRIPTION OF THE DRAWINGS

FIG. 5 is a plan, fragmentary view of the seed metering system shown in FIG. 3; and FIG. 6 is a perspective, fragmentary view of another embodiment of a seed metering system of the present invention.

DETAILED DESCRIPTION OF THE INVENTION

Figure 1:
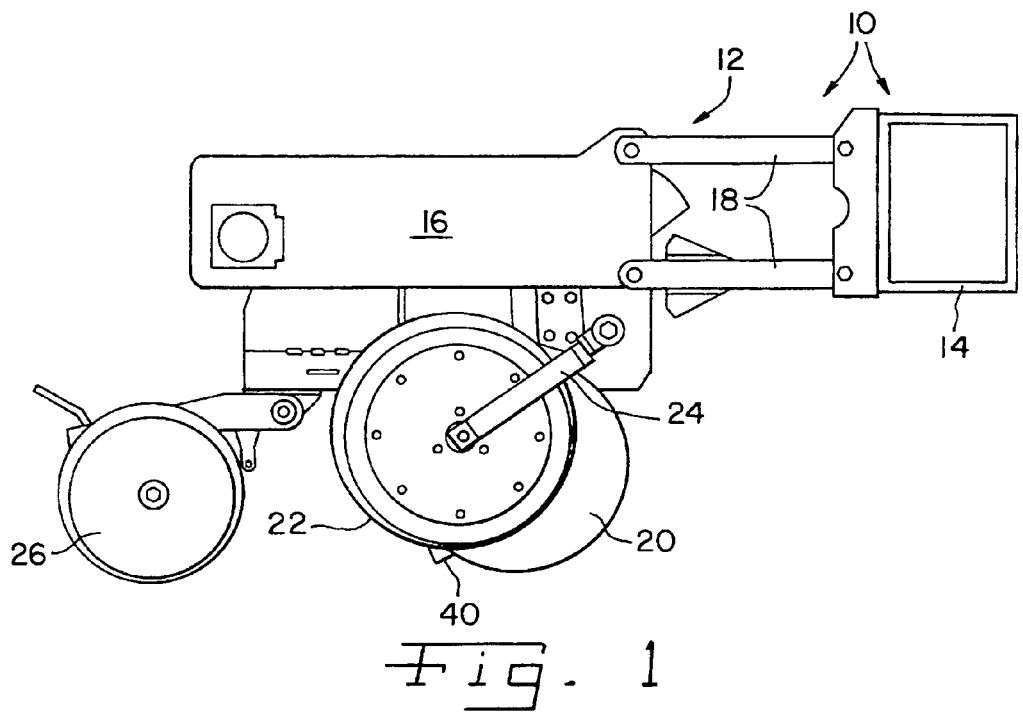
FIG. 1 is a side view of an embodiment of a seeding machine of the present invention including a row crop unit.
Figure 2:
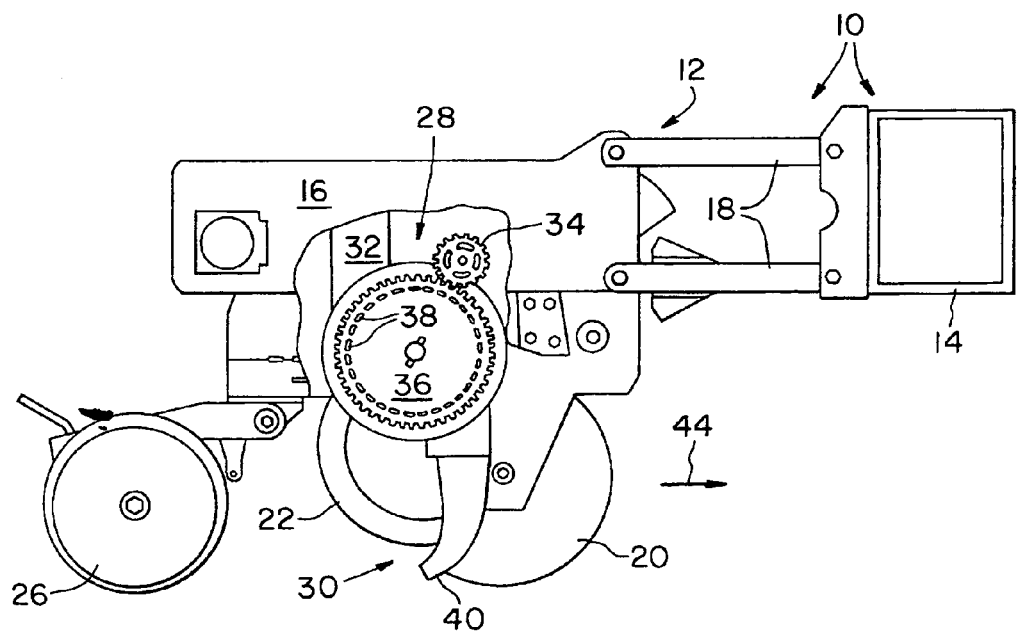
FIG. 2 is a partially fragmentary, side view of the row crop unit shown in FIG. 1, illustrating the internal components of the seed metering system and seed placement system.

Referring now to the drawings, and more particularly to FIGS. 1 and 2, there is shown an embodiment of a seeding machine 10 of the present invention. FIGS. 1 and 2 illustrate a single row crop unit 12 of a multi-row planter, with each row crop unit 12 being substantially identical and connected to a common tool bar 14. Only a single row crop unit 12 is shown for simplicity sake.

Row crop unit 12 includes a multi-part frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc.

Frame 16 carries a double disk furrow opener 20 for forming a seed trench in soil. A pair of gauge wheels 22 are respectively associated with the pair of disks of double disk furrow opener 20. More particularly, each gauge wheel 22 is positioned generally in line with and immediately adjacent to the outside of each respective disk of double disk furrow opener 20. Gauge wheels 22 are pivotally coupled with frame 16 by respective arms 24. Each gauge wheel 22 may be vertically adjusted to adjust the depth of the trench which is cut into the soil using double disk furrow opener 20.

A pair of closing wheels 26 are also carried by frame 16. Closing wheels 26 are positioned generally in line with double disk furrow opener 20.

Referring now to FIG. 2, each row crop unit 12 of seeding machine 10 carries a seed metering system 28 and a seed placement system 30. Seed metering system 28 includes an inlet chute 32 which receives seed from a main seed supply, such as a seed hopper carried above frame 16. Alternatively, seed may be stored in a distant main seed hopper and supplied to inlet chute 32 via air or the like.

Seed metering system 28 also includes a drive wheel 34 which drives a seed disk 36 having a plurality of seed cells 38 intermittently spaced about the periphery thereof. A vacuum source (not shown) applies vacuum pressure to seed cells 38 formed in seed disk 36. This vacuum pressure promotes entry of the seeds into seed cells 38 and maintains the seeds in place within seed cells 38. Seeds are transported from seed cells 38 to seed placement system 30.

Seed placement system 30 includes a seed tube 40 which directs seed at a predetermined rate and spacing into the seed trench formed by double disk furrow opener 20. Seed tube 40 has a width in a direction transverse to the seed trench which is less than the width of the seed trench, but may also be approximately equal to the width of the seed trench. Seed tube 40 is configured such that seed falls into the seed trench and also acts as a wind shield for the seed.

Although seed placement system 30 is shown as including a seed tube 40, it is also possible for seed placement system 30 to be differently configured. For example, seed placement system 30 can include a seed slide and adjacent driven brush wheel which direct seed at a predetermined rate into the seed trench formed by double disk furrow opener 20.

Figure 3:
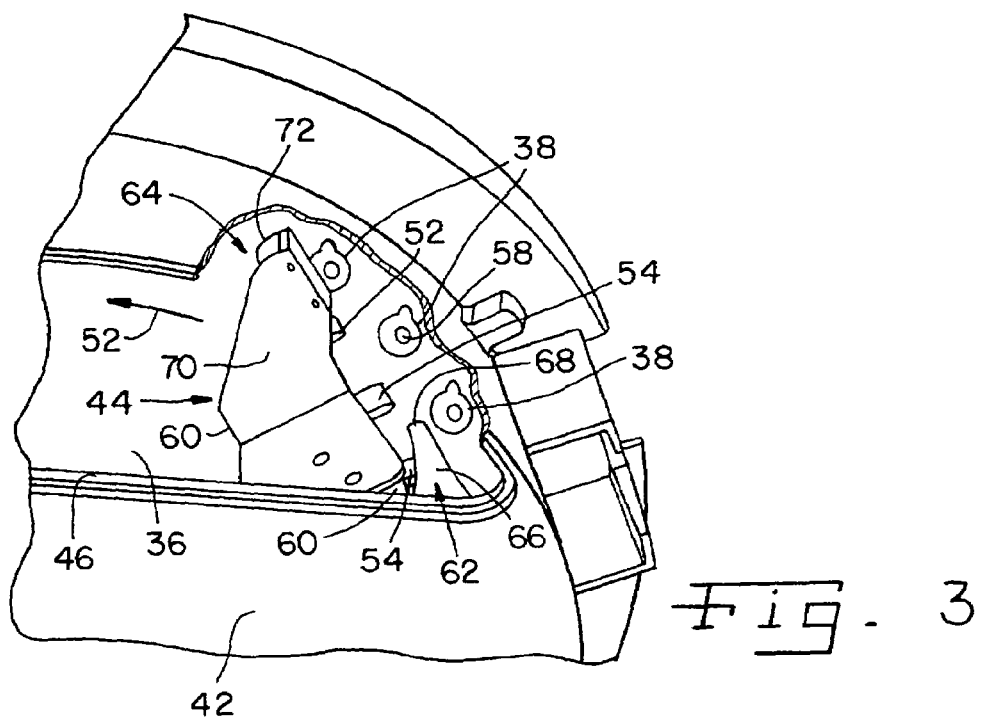
FIG. 3 is a perspective, fragmentary view of an embodiment of a seed metering system of the present invention.
Figure 4:
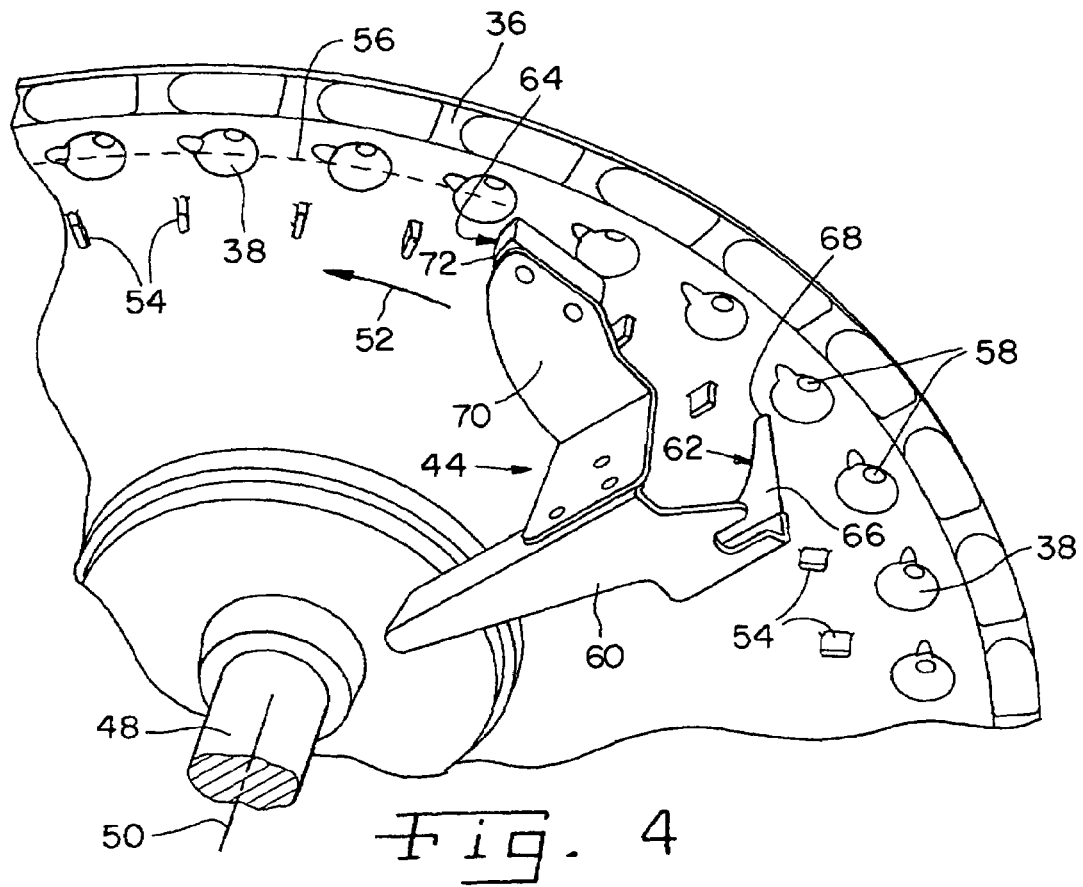
FIG. 4 is a another perspective view of the seed disk and seed singulator shown in FIG. 3.

Referring now to FIGS. 3-5, seed metering system 28 will be described in greater detail. Seed metering system 28 includes, among other parts, a housing 42, seed disk 36 and seed singulator 44. Housing 42 typically is a cast metal housing and includes an access opening 46. Housing 42 includes suitable couplers for connection with a source of mechanical power (e.g., a ground drive shaft), a source of seed (e.g., a seed hopper or remote tank), and a source of vacuum (e.g., a vacuum pump).

Seed disk 36 is disposed within and rotatably carried by housing 42. More particularly, seed disk 36 is mounted on a shaft 48 defining a rotational axis 50 of seed disk 36. Shaft 48 is directly or indirectly carried by housing 42. In the illustrations of FIGS. 3-5, seed disk 36 rotates in a counter-clockwise direction, as indicated by arrow 52.

Seed disk 36 includes a plurality of seed cells 38 and a plurality of seed accelerators 54. Seed cells 38 are angularly spaced at a common radius about rotational axis 50, and define a generally circular travel path 56 during rotation of seed disk 36. In the embodiment shown, each seed cell 38 has a generally tear drop shape with a hole 58 at the base of each tear drop. The open side of each seed cell is sized to receive a seed therein, and hole 58 is in communication with a vacuum source for creating a vacuum pressure on the backside of each hole 58. This vacuum pressure is used to retain a seed in seed cell 38 during operation.

The narrow end of the tear drop at the open side of each seed cell 38 is used to direct the seed out of seed cell 38 toward seed placement system 30. In FIGS. 3 and 4, vacuum pressure is released from the backside of each seed cell 38 as the seed cells 38 rotate past about a 9 O'clock position, allowing the seeds to fall via gravitational force through the narrow end of the tear drop and toward seed placement system 30.

Seed accelerators 54 are angularly spaced about rotational axis 50, and are positioned generally adjacent to circular travel path 56 at the radially inner side of seed cells 38. Although seed accelerators 54 are shown positioned at a radius which is less than the common radius of seed cells 38, it may also be possible to position seed accelerators 54 at a radially outer side of seed cells 38. Seed accelerators 54 are in the form of protrusions which pass through the pool of seed in the bottom of housing 42, and function to stir the seed and assist in movement of a seed into seed cell 38 under the effect of the pressure differential.

Seed singulator 44 includes a bracket 60, first resilient seed deflector 62 and second resilient seed deflector 64. According to an aspect of the present invention, each resilient seed deflector 62 and 64 includes a resilient member providing a degree of flexibility, and a seed deflector at the distal end of each resilient member. The seed deflector can simply be the end of the resilient member, or a separate body which is attached to the distal end of the resilient member.

More particularly, first resilient seed deflector 62 includes a first resilient member 66 in the form of a resilient finger. Resilient finger 66 is made from a resilient metal plate, such as a thin stainless steel plate. The distal end of resilient finger 66 defines a first seed deflector 68 which is positioned between seed cells 38 and seed accelerators 54. First seed deflector 68 wipes away excess seed(s) that may be clinging to the side of seed disk 36 in the area between seed cells 38 and seed accelerators 54.

It is also possible to attach a suitably configured deflector body to the outboard end of resilient finger 66, depending upon the application. Further, it is also possible to position first seed deflector 68 at the radially outer side of seed cells 38, depending upon the application.

Second resilient seed deflector 64 includes a second resilient member 70 in the form of a thin metal plate, such as a stainless steel plate. A second seed deflector 72 in the form of a wedge shaped body is attached to the distal end of second resilient member 70. Wedge shaped body 72 is generally positioned at the radially inner side of circular travel path 56 and extends partially across the extent of an adjacent seed cell 38. It is also possible to position wedge shaped body 72 at the radially outer side of seed cells 38, depending upon the application. Wedge shaped body 72 wipes away excess seed(s) at the outboard side of seed cell 38 (i.e., doubles).

FIG. 6 illustrates another embodiment of a seed singulator 80 of the present invention, similar to seed singulator 44 in many respects. Seed singulator 80 includes a pair of resilient seed deflectors 82 and 84 which are each positioned adjacent a radial side of seed cells 38. However, each resilient seed deflector 82 and 84 is in the form of a resilient metal plate, with no deflector body at the distal end. Further, resilient seed deflector 82 is positioned at the radially inner side of seed cells 38 and resilient seed deflector 84 is positioned at the radially outer side of seed cells 38.

During use, a selected seed type is received from a main seed supply at inlet chute 32 of seed metering system 28. The seed is maintained against a side of seed disk 36, which is driven by drive wheel 34 at a selected rotational speed using a mechanical drive, hydraulic motor, electric motor or other suitable drive. Seeds are received within seed cells 38 of seed disk 36. To assist seed movement into seed cells 38, a vacuum pressure is applied to the opposite side of seed disk 36 using a suitable vacuum source at the back side of holes 58, and seed accelerators 54 stir the seed and accelerate the seed to a travel velocity approximating the rotational speed of seed disk 36. Of course, a positive pressure may also be applied to the side of seed disk 36 at which the seeds are disposed. First seed deflector 68 wipes away excess seeds in the area between seed cells 38 and seed accelerators 54, and second seed deflectors 72 wipe away excess seeds at the open side of seed cells 38. First resilient member 66 and second resilient member 70 normally are positioned as shown and do not bend out of the way. However, in the event that a seed catches on a seed accelerator 54 or an edge of a seed cell 38, it is desirable for the resilient seed deflector 62 and/or 64 to deflect out of the way and avoid splitting the seed, since the broken seed would likely not germinate in the soil. Thus, resilient members 66 and 70 allow resilient seed deflector 62 and/or 64 to deflect during operation. The singulated seeds are discharged from seed metering system 28 at a predetermined rate to seed placement system 30. The seed is discharged from the bottom end of seed tube 40 into the seed trench formed in the soil. Closing wheels 26 close the seed trench and thereby cover the seed in the trench.

The present invention allows singulation of difficult to singulate seeds using celled seed disks that customers typically already have. The seed singulator of the present invention maintains celled disk seed release trajectory, is easier to adjust or requires no adjustment, and requires less vacuum than a flat disk.

Having described the preferred embodiment, it will become apparent that various modifications can be made without departing from the scope of the invention as defined in the accompanying claims.

The invention claimed is:

1. A seeding machine, comprising:
    at least one seed metering system, each said seed metering system including:
    a housing;
    a seed disk disposed within said housing, said seed disk including a rotational axis and a plurality of seed cells angularly spaced at a common radius about said rotational axis, said seed cells defining a generally circular travel path; and
    a seed singulator including a bracket, a first resilient seed deflector coupled with said bracket and deflectable relative to said bracket upon engaging a seed in one of said seed cells, and a second resilient seed deflector coupled with said bracket and deflectable relative to said bracket upon engaging a seed in one of said seed cells, both said first resilient seed deflector and said second resilient seed deflector including a substantially planar resilient member.

2. The seeding machine of claim 1, wherein said first resilient seed deflector is positioned generally at a radially inner side of said travel path relative to said rotational axis, and said second resilient seed deflector is positioned generally at one of a radially inner side and a radially outer side of said travel path relative to said rotational axis.

3. The seeding machine of claim 2, wherein said seed disk includes a plurality of seed accelerators angularly spaced at a radius which is less than said common radius of said seed cells, and said first resilient seed deflector has a distal end positioned between said plurality of seed accelerators and said common radius of said seed cells.

4. The seeding machine of claim 1, wherein said substantially planar resilient member of said first resilient seed deflector comprises a resilient finger, and said second resilient seed deflector comprises a second seed deflector coupled with said bracket via said substantially planar resilient member of said second resilient seed deflector.

5. The seeding machine of claim 4, wherein said resilient finger comprises a resilient metal plate.

6. The seeding machine of claim 5, wherein said seed disk includes a plurality of seed accelerators adjacent said circular travel path of said seed cells, and said resilient finger has a distal end positioned between said plurality of accelerators and said travel path.

7. The seeding machine of claim 1, wherein said second resilient seed deflector comprises a wedge shaped deflector coupled with said bracket via said substantially planar resilient member.

8. The seeding machine of claim 7, wherein said wedge shaped deflector is positioned generally at a radially inner side of said travel path relative to said rotational axis.

9. The seeding machine of claim 1, wherein said seeding machine includes a plurality of row crop units, each said row crop unit including one said metering system.

10. A seeding machine, comprising:
    at least one seed metering system, each said seed metering system including:
    a housing;
    a seed disk disposed within said housing, said seed disk including a rotational axis and a plurality of seed cells angularly spaced at a common radius about said rotational axis, said seed cells defining a generally circular travel path; and
    a seed singulator including a substantially planar resilient member and a seed deflector, said resilient member being deflectable upon said seed deflector engaging a seed in one of said seed cells, and said seed deflector positioned adjacent said travel path of said seed cells.

11. The seeding machine of claim 10, wherein said seed singulator includes a bracket, and said resilient member is coupled with said bracket at one end thereof and coupled with said seed deflector at an opposite end thereof.

12. The seeding machine of claim 10, wherein said seed deflector comprises a distal end of said resilient member.

13. The seeding machine of claim 10, wherein said seed deflector is positioned generally on a radially inner side of said travel path relative to said rotational axis.

14. The seeding machine of claim 10, wherein said resilient member comprises a resilient metal plate.

15. The seeding machine of claim 10, wherein said seed deflector comprises a body attached to said resilient member.

16. The seeding machine of claim 15, wherein said seed deflector comprises a wedge shaped body.

17. The seeding machine of claim 10, wherein said seed disk includes a plurality of seed accelerators adjacent said circular travel path of said seed cells, and said seed deflector is positioned between said plurality of accelerators and said travel path.

18. A seed singulator for use in singulating seeds in seed cells of a seed disk, said seed singulator comprising:

a bracket;

a first resilient seed deflector coupled with said bracket and including a first substantially planar resilient member and a first seed deflector, said first resilient member being deflectable relative to said bracket upon engaging a seed in one of the seed cells; and a second resilient seed deflector coupled with said bracket and including a second substantially planar resilient member and a second seed deflector, said second resilient member being deflectable relative to said bracket upon engaging a seed in one of the seed cells.

19. The seeding machine of claim 18, wherein said first seed deflector comprises a distal end of said first resilient member.

20. The seeding machine of claim 18, wherein said second seed deflector comprises a body attached to said second resilient member.

21. The seeding machine of claim 20, wherein said second seed deflector comprises a wedge shaped body.

* * * * *